H. L. WRIGHT.
STEERING DEVICE FOR TRACTORS.
APPLICATION FILED NOV. 30, 1914.
1,165,481.
Patented Dec. 28, 1915.
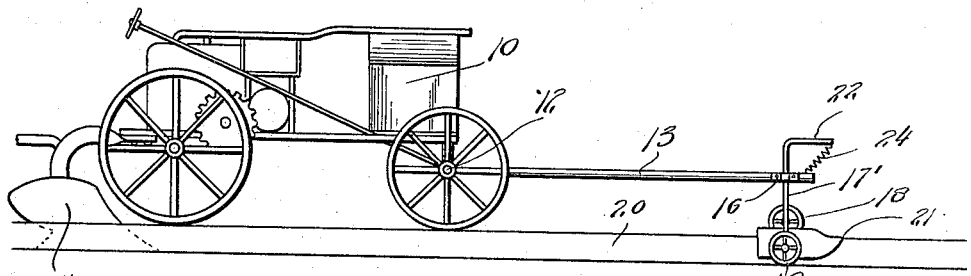
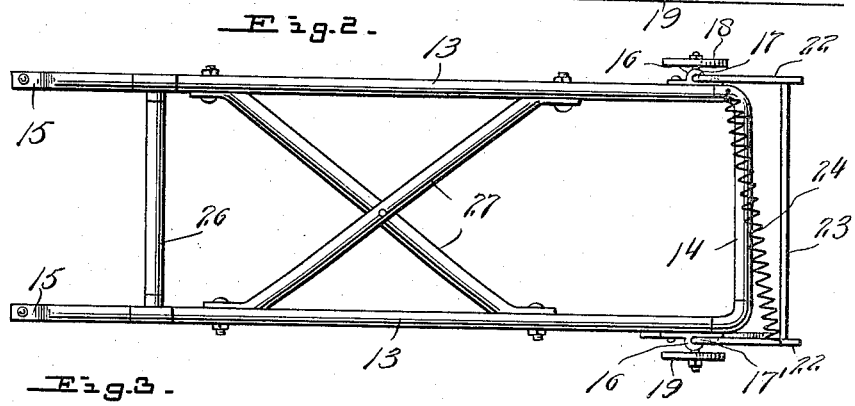
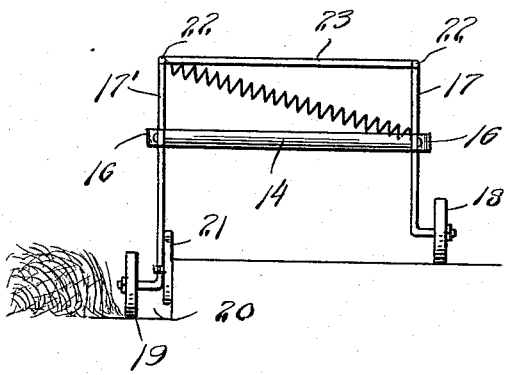
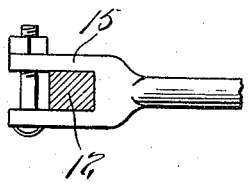

UNITED STATES PATENT OFFICE.

HERSCHEL L. WRIGHT, OF SOLOMON, KANSAS.

STEERING DEVICE FOR TRACTORS.

1,165,481.   Specification of Letters Patent.   Patented Dec. 28, 1915.

Application filed November 30, 1914. Serial No. 874,842.

*To all whom it may concern:*

Be it known that I, HERSCHEL L. WRIGHT, a citizen of the United States, residing at Solomon, in the county of Dickinson, State of Kansas, have invented certain new and useful Improvements in Steering Devices for Tractors; and I do hereby declare the following to be a full, clear, and exact description of the invention, such as will enable others skilled in the art to which it appertains to make and use the same.

This invention relates to improvements in plows, and particularly to motor operated plows.

The principal object of the invention is to provide a simple and novel device for automatically steering the tractor so that the plow will turn a furrow in parallel relation to the preceding furrow.

Another object is to provide a simple device of this character which can be readily attached to the ordinary plow drawing tractor so that the front wheels of the tractor will be oppositely guided.

Other objects and advantages will be apparent from the following description when taken in connection with the accompanying drawings.

In the drawings: Figure 1 is a side elevation of my invention applied to a tractor, Fig. 2 is a top plan view, Fig. 3 is a front elevation showing the same in a furrow, and Fig. 4 is a sectional detail view through the coupling of the steering attachment with the front axle.

Referring particularly to the accompanying drawing, 10 represents a tractor which draws the plow 11, this tractor including a front axle 12, to which my device is attached. The device consists of a frame including the longer parallel side bars 13 connected at their forward ends by a transverse member 14, the rear ends of the members 13 being provided with suitable clamps 15 for securing the same to the axle 12 so that when the frame swings to the right or left the front axle will be correspondingly swung to steer the tractor. Mounted on the forward end of the side members 13, and in roller bearing boxes 16 are standards 17 17', the lower ends of which are respectively equipped with the wheels 18 and 19. The wheel 18 is adapted to travel on the unplowed land while the wheel 19 travels in the furrow 20. Also carried by the lower end of the standard 17 and bearing against the wall of the furrow is a shield plate 21. The upper ends of the standards 17 17' are extended forwardly in parallel relation as indicated at 22, these extensions being pivotally connected as at 22' by a transverse bar 23. Connected to the member 22 of the standard 17 at one end and at its other end to the opposite side of the frame is a strong spring 24 which normally tends to swing the standards and steer the wheels toward the landside of the furrow. A transverse member 26 connects and spaces the members 13 of the frame while crossed braces 27 connect the intermediate portions of the side members.

It will be noted that the steering frame is connected to the front of the tractor and is pushed along in the furrow at the head of the tractor, the shield plate 21 bearing against the vertical wall of the furrow. When a bulge is encountered by the shield plate, the frame will be swung so as to cause the plow to move slightly to the right, but when a depression is encountered in the wall of the furrow the shield plate will enter the depression and swing the frame to the left. The spring 24 thus holds the frame so as to travel in parallel relation with the furrow thus holding the tractor to its course and automatically changing the course of the tractor when bulges or depressions are encountered in the furrow wall.

What is claimed is:

A steering attachment for the front axle of a plow tractor comprising a frame detachably secured to the axle, vertical standards mounted on the forward end of the frame, the lower end of each standard being provided with a ground engaging wheel, one of which travels on the unplowed land while the other travels in the furrow, a shield plate mounted on one of the standards and normally engaging the wall of the furrow, connections between the upper ends of the standards for causing their simultaneous movement, and a spring connected to the furrow standard at one end and to the opposite side of the frame at the other end to normally force the shield plate against the wall of the furrow.

In testimony whereof, I affix my signature, in the presence of two witnesses.

HERSCHEL L. WRIGHT.

Witnesses:
E. HUTCHISON,
BESSIE LEACH.

Copies of this patent may be obtained for five cents each, by addressing the "Commissioner of Patents, Washington, D. C."